United States Patent
Adler

[11] 3,985,952
[45] Oct. 12, 1976

[54] ELASTO-OPTIC DEVICE FOR SPOT WOBBLE IN A VIDEO DISC PLAYER

[75] Inventor: Robert Adler, Northfield, Ill.

[73] Assignee: Zenith Radio Corporation, Chicago, Ill.

[22] Filed: Jan. 27, 1975

[21] Appl. No.: 544,250

Related U.S. Application Data

[63] Continuation-in-part of Ser. No. 439,683, Feb. 4, 1974, abandoned.

[52] U.S. Cl. .................. 178/6.6 R; 178/6.6 DD; 178/6.7 A; 179/100.3 V; 350/161
[51] Int. Cl.² .................. H04N 5/76; G11B 11/00
[58] Field of Search ........ 178/6.6 R, 6.6 DD, 6.7 A; 179/100.3 B, 100.3 V; 250/235, 202; 350/6, 161, 285; 360/77; 340/173 LS

[56] References Cited
UNITED STATES PATENTS

| | | | |
|---|---|---|---|
| 3,661,441 | 5/1972 | Uchida | 350/161 |
| 3,673,412 | 6/1972 | Olson | 179/100.3 V |
| 3,795,902 | 3/1974 | Russell | 178/6.6 R |
| 3,836,225 | 9/1974 | Wilde | 350/6 |
| 3,848,095 | 11/1974 | Wohlmut | 179/100.3 V |
| 3,874,785 | 4/1975 | Huignard | 350/285 |
| 3,876,842 | 4/1975 | Bouwhuis | 179/100.3 V |

OTHER PUBLICATIONS

"Application of Ultrasonic Standing Waves to the Generation of Optical-Beam Scanning", by Aas and Erf, The Journal of the Acoustical Society of America, vol. 36, No. 10, pp. 1906–1913, Oct. 1964.

*Primary Examiner*—Bernard Konick
*Assistant Examiner*—Alan Faber
*Attorney, Agent, or Firm*—John J. Pederson

[57] ABSTRACT

An elasto-optic device for providing periodic lateral displacement in a radial tracking servo system for a video disc player. A transparent prism is vibrated in either a flexural or a second harmonic extensional mode by a thin piezoelectric ceramic platelet attached to a side of the prism and energized by an oscillatory signal. Vibration occurs at a natural mechanical resonant frequency of the prism, and a linear strain distribution is established in the prism at its intersection with the path of the optical beam used for reading the record track. The substantially linear strain distribution effects a corresponding localized periodic change in the index of refraction of the prism material to provide lateral optical beam deflection without the use of moving parts.

3 Claims, 8 Drawing Figures

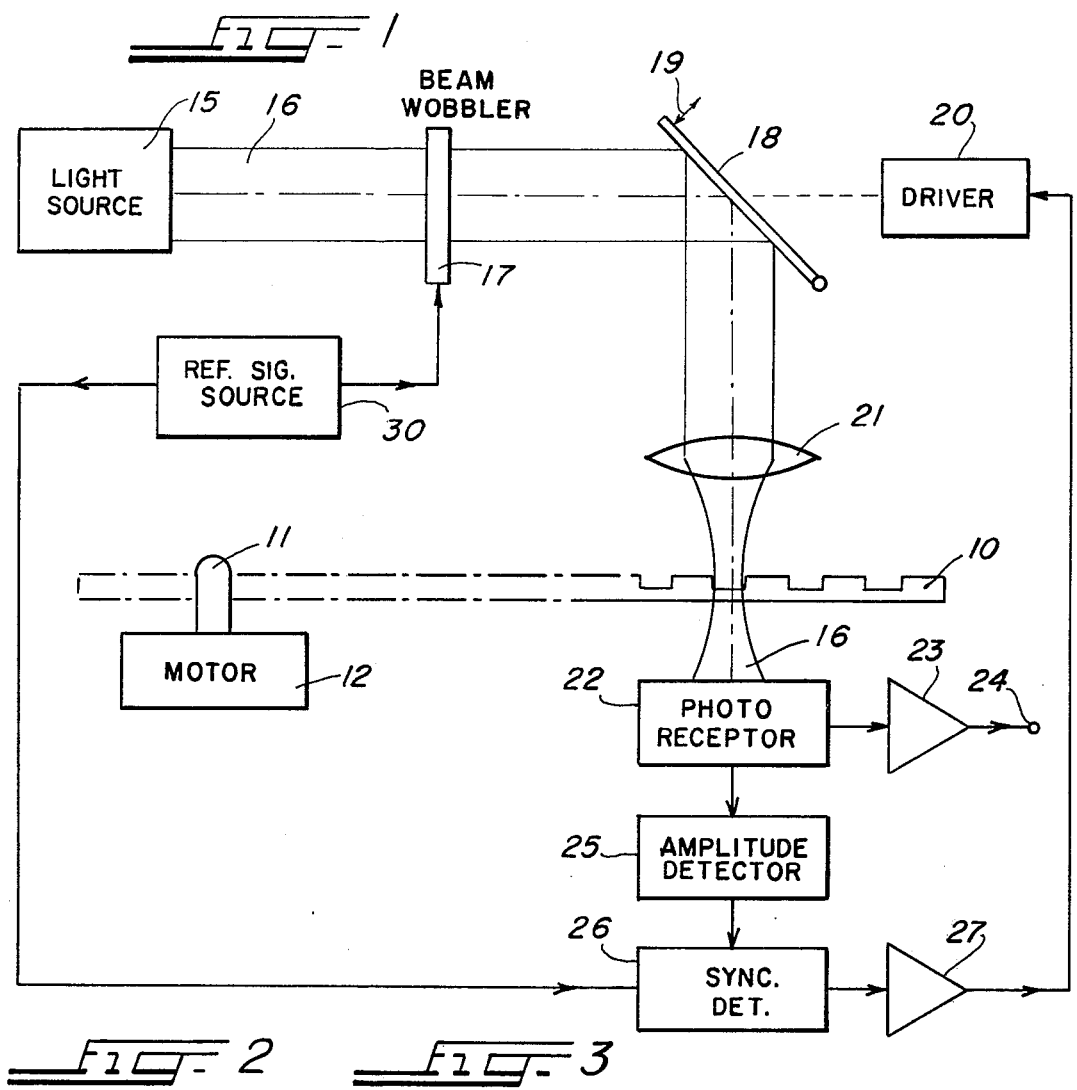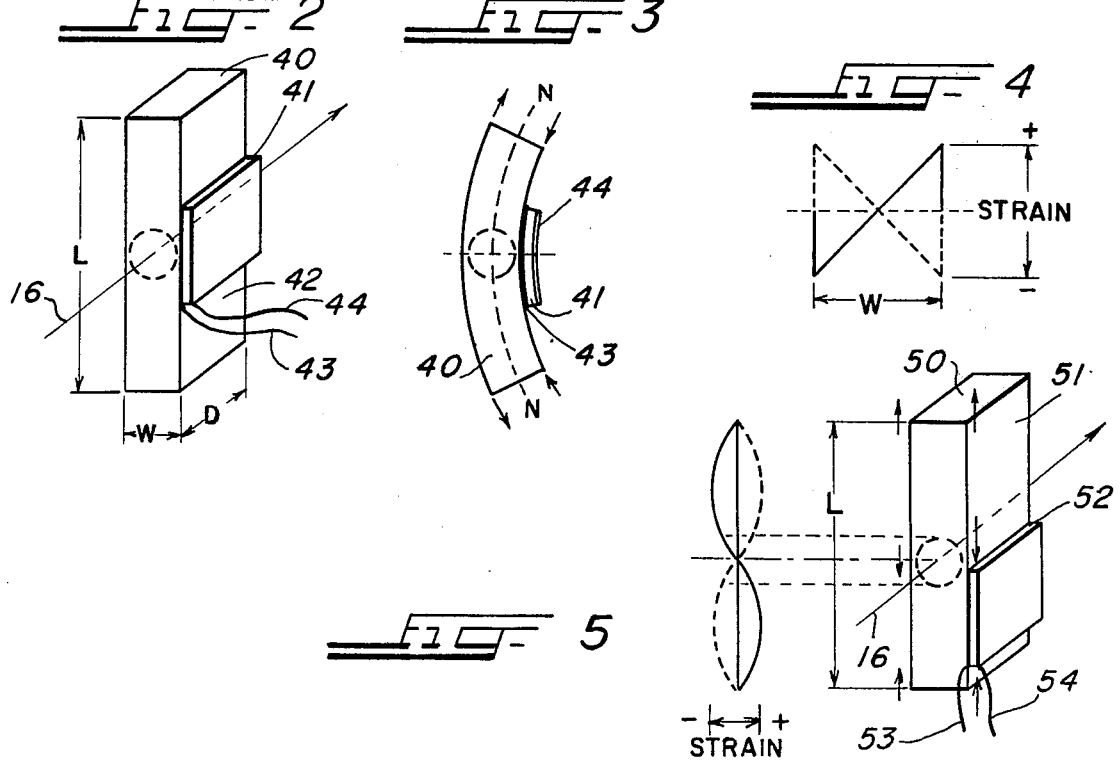

ELASTO-OPTIC DEVICE FOR SPOT WOBBLE IN A VIDEO DISC PLAYER

RELATED APPLICATION

This application is a continuation-in-part of the copending application Ser. No. 439,683 of Robert Adler, filed Feb. 4, 1974, for "Improved Tracking Arrangement for an Optical Image Reproducing System," and assigned to the same assignee as the present application, now abandoned.

BACKGROUND OF THE INVENTION

This application relates to optical pick-up video disc players and more particularly to radial tracking servo systems using elasto-optic devices for causing periodic lateral displacement of the light beam in an optical pick-up video disc player as it reads the record track.

In an optical pick-up video disc record player, a focused light beam follows a spiral track as the disc rotates. The track usually consists of depressions, which may but need not be in the form of uniform-depth pits of varying lengths, having a radial width the order of one micron. Adjacent turns of the track are spaced from each other by a distance of from one to four microns. The normal eccentricity of the disc, which is typically 50 microns but possibly as much as 100 microns, makes it necessary to provide a radial tracking servo system. Proper operation of such a servo system requires a sensing signal, that is, a control voltage proportional to any excursion of the focused spot from the center of the record track.

There are several methods known for developing the required sensing signal. One method that has been proposed is called spot wobble. The focused light beam spot is moved periodically back and forth across the track in a radial direction at a rapid rate. Its excursion in each direction during this periodic motion is only a fraction, such as 20 percent, of the light spot size which typically may be one micron in diameter. The intelligence signal derived from the record track, which contains both DC and radio frequency components, is a maximum when the spot is centered upon the track; in that case, the rapid periodic motion of the spot is also centered about the track, with the result that the fluctuation of signal amplitude produced by the spot wobble is small and has no component at the wobble frequency. If, however, the spot drifts off the center of the track, then the periodic excursions to one side will produce a significant drop in amplitude while the excursions to the other side will produce no such drop and may even produce an increase in the signal if the spot is sufficiently far off-center. Thus the magnitude and polarity of any signal amplitude fluctuation at the wobble frequency is indicative of the departure of the spot from its correct position on the record track. To generate a sensing signal, such signal amplitude fluctuation must be derived from the photoreceptor output and its polarity compared with a reference signal at the wobble frequency. This comparison is done in a synchronous detector; the reference signal is taken from the signal source that produces the spot wobble in the first place. The output from the synchronous detector may then be used as the sensing signal for the radial tracking servo system.

As stated previously, the primary function of the radial tracking servo loop is to compensate for the radial motion of the record track caused by record disc eccentricity. This motion occurs typically at a rate of 30 Hertz and may have an amplitude as large as 100 microns. Assuming that it is desired that the focused spot stay within 0.1 micron of the track center, the servo loop must have a gain of 1000 at a frequency of 30 Hertz. At higher frequencies, the loop gain may be permitted to decrease; it must finally drop to unity at some frequency $f_o$. There is an additional requirement imposed upon the radial tracking servo system if it is desired to provide for stop-frame or slow-motion operation; in such operation, the spot is made to switch rapidly from one turn of the track to another, and it is desired that operation in the new turn become stable within no more than about 100 microseconds. This requires that the radial tracking servo loop gain be above unity up to frequencies of several thousand Hertz.

If a spot wobble system operating on a wobble frequency $f_w$ is used and the frequency $f_w$ is too close to $f_o$, it becomes difficult to suppress the residual wobble-frequency component from the output of the synchronous detector without incurring undesirable phase delay at the frequency $f_o$. For this reason, the wobble frequency $f_w$ should be chosen several times higher than $f_o$. Practical experience has shown that it is desirable to avoid the horizontal scanning frequency of 15,734 Hertz and its harmonics. Frequency bands such as 20 to 27, 36 to 43, or 52 to 58 kilohertz are particularly suitable for $f_w$.

Deflection of the light spot by 0.2 microns represents only about one five-hundredth of the deflection capability of a typical radial tracking system. It has therefore been proposed to produce the spot wobble with the same mechanism — usually a movable mirror — that is used for radial tracking. This however is impractical at the high wobble frequencies mentioned, because of the excessive acceleration that would be needed. Acceleration equals the product of excursion and the square of the angular frequency. Hence a deflection of 0.2 micron at 20 kilohertz represents 900 times the acceleration required to produce a deflection of 100 microns at 30 Hertz. This is an impossible requirement for the usual radial tracking mechanism.

It has been proposed to produce the wobble frequency deflection by means of a separate mirror mounted on a support that is constructed so as to be resonant at the wobble frequency in a flexural mode of vibration, which results in tilting of the mirror. A device of this kind has the disadvantage that the mirror necessarily redirects the light beam; therefore the orientation of the mirror is critical and must be adjusted precisely.

OBJECTS OF THE INVENTION

It is a primary object of the invention to provide a new and improved radial tracking servo system for an optical-pickup video disc player.

It is another object of the present invention to provide a new and improved device for providing radial spot wobble in an optical pickup video disc player.

A further object of the invention is to provide such a device which has no moving parts, needs little driving power, and does not require critical alignment with respect to the optical reading beam.

SUMMARY OF THE INVENTION

The subject of the invention is a device which permits attaining the required light deflection at the frequencies mentioned, or at even higher frequencies, by utilizing the elasto-optic effect in transparent materials. Light transmission, rather than light reflection, is used; as a consequence, the beam path is not broken or redirected and there is no need for precise orientation of the transparent device. In accordance with the invention, the elasto-optic device is operated in a mechanically resonant vibration mode, thus minimizing the power input required to maintain vibration. To insure such operation, the electrical driving circuit is so arranged that the mechanical resonance controls the electrical driving frequency; in other words, the elasto-optic beam deflecting device is employed as the frequency-determining element of the reference signal oscillator which, through a quadrature phase corrector, drives the synchronous detector to develop a radial tracking error correction signal. The elasto-optic device comprises a transparent prism interposed in the path of the optical reading beam and mechanically resonant in a predetermined vibration mode at the desired spot wobble frequency. An electromechanical transducer is mechanically coupled to the prism and is responsive to an applied oscillatory signal to establish vibration of the prism in the desired mode at mechanical resonance, with a substantially linear strain distribution pattern in the region of the prism intercepting the beam path. Both flexural mode and second harmonic extensional mode embodiments are described.

DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a schematic diagram of an optical pickup video disc player system embodying an elasto-optic optical beam deflection device or beam wobbler constructed in accordance with the present invention;

FIG. 2 is a perspective view of a flexural-mode elastooptic beam deflection device embodying the present invention;

FIG. 3 is a front view of the device of FIG. 2 showing, in greatly exaggerated form, its configuration at one peak of its flexural mode vibration cycle;

FIG. 4 is a graphical representation showing the strain distribution pattern in the device of FIGS. 2 and 3 in the region intercepting the optical beam path;

FIG. 5 is a perspective view of a second harmonic extensional mode elasto-optic beam deflection device embodying the invention, with an associated graphical representation of the strain distribution pattern established within the deflection device in the region intercepting the optical beam path;

DESCRIPTION OF THE PREFERRED EMBODIMENTS

Figure 6:
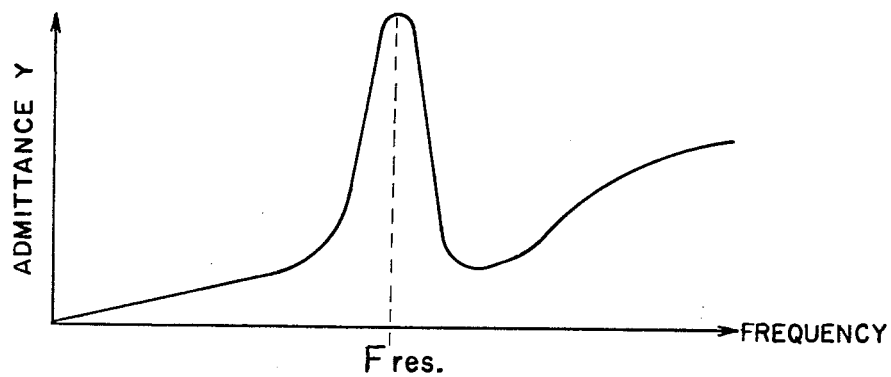
FIG. 6 is a graphical representation showing the admittance of the elasto-optic beam deflector of FIG. 2 as a function of driving signal frequency.

FIG. 1 is a simplified representation of a system embodying the invention, using a laser source for the reading beam. As shown, a storage medium in the form of a transparent video disc 10 of a plastic material, such as polyvinyl chloride, has a multi-turn spiral storage track containing information to be derived by reading the storage track with a reading beam of light energy. The disc is shown in partial radial cross section for rotation on a spindle 11 driven by a motor 12. Sometimes the disc is formed of sufficient thickness to be rigid like an audio record and it is then supported for rotation at an appropriate speed. In other executions of the system the disc is so thin, of the order of 4 to 8 mils, as to be flexible in which case it is supported at a centrally located aperture and rotated at a high speed in a technique known as flying the disc. Both methods of support are known and both are useful in systems embodying the present invention. It will be assumed that video disc 10 is light-transmissive and has been prepared as a replica of a master recording of an angular-velocity (frequency) modulated carrier signal modulated in accordance with program information comprising luminance, chroma and audio components as well as timing or synchronizing components. Each convolution of the record track represents two interlaced fields of an image with their associated timing information and the temporal variations of the recorded carrier signal take the form of a succession of pits and lands, of a common uniform width but variable in longitudinal dimension, alternating along the record track.

Record disc 10 is read by a reading beam produced by a light source 15 which may be a helium-neon laser directing a collimated beam 16 along an optical path including a beam wobbling device 17, to be considered more particularly hereafter, and a pivoted mirror 18 that is displaceable as indicated by arrow 19 under the control of a driver 20 for radial tracking purposes. Preferably mirror 18 and its driver 20 are constructed in the manner described in copending Adler et al. application Ser. No. 439,684, filed Feb. 4, 1974, and assigned to the same assignee as the present application, now abandoned. It is cantilever-mounted piezoelectric bender or bimorph carrying mirror 18 at its free end for displacement in accordance with the polarity and intensity of an applied error signal. A lens 21 focuses reading beam 16 on the track of the record and light emerging from the disc, modulated in accordance with the stored information, is received by a photoreceptor 22 which supplies an output signal, representing the stored information, through an amplifier 23 to an output terminal 24. The utilizing device is supplied from that terminal and may include a transcoder for converting the recovered information signal to a form appropriate to be fed to the antenna input of a home color television receiver. A second output of the photoreceptor system is used to derive a signal representing amplitude fluctuations at the wobble frequency. This may be accomplished by a simple low-pass filter utilizing the DC component or, as illustrated, by an amplitude detector responsive to the radio frequency component, and the derived signal is delivered to a synchronous detector 26 which develops an error signal for application through another amplifier 27 to driver 20. Synchronous detection in proper phase relation to wobbulation of the reading beam is achieved by a reference signal source 30 coupled to beam wobbler 17 and to synchronous detector 26.

Neglecting for the time being the construction and operation of beam wobbler 17, the described optical video disc system will be recognized as a well known arrangement of the prior art. As disc 10 is rotated, its storage track is scanned by the reading beam to the end that light emerging from the transmissive disc energizes photo-detector 22 and develops the desired output signal representing the stored information. At the same time, an error signal is developed by detector 26, related in magnitude and polarity to any misregistration existing when the reading beam is not in optimum radial tracking alignment with the storage track of the disc being read. This error signal, by energizing driver 20, adjusts the position of mirror 18 to maintain radial beam tracking, that is to say, to maintain the beam in proper tracking relation with the record track.

Beam wobbler 17 periodically displaces the reading beam at a particular frequency laterally of the storage track while the beam is reading that track. As a consequence of the cyclical beam displacement, during intervals of misregistration of the beam relative to the track the output signal of photoreceptor 22 is amplitude modulated at the wobble frequency. The intensity of the amplitude modulation is proportional to the degree of tracking misregistration and the phase of the modulation represents the sense of the misregistration.

More particularly, if the mean position of the beam is displaced to the right of its optimum tracking condition, during those half cycles when the wobble displaces the beam even further to the right, the intensity of energization of photoreceptor 22 increases whereas in opposite half cycles, the intensity of energization decreases. This is an amplitude modulation of the photoreceptor signal of one phase and of a particular amount. Were the mean position of the reading beam to have been displaced a like amount to the left of its proper position of registration, the photoreceptor would receive greater energization during half cycles that displace the beam further to the left and lesser energization in those half cycles that displace the beam to the right. This occasions amplitude modulation of the photoreceptor output signal of like amount but opposite in phase.

The signal developed in the photoreceptor is detected by amplitude detector 25 and supplied to synchronous detector 26 which also receives from a source 30 a reference signal phase synchronized with the periodic wobbling of the reading beam. Synchronous detection of the amplitude modulated wobble-frequency component of the signal input to detector 26 develops an error signal of appropriate amplitude and polarity to control driver 20 and maintain radial tracking registration. In other words, the described optical reproducing system, featuring wobbling of the reading beam, derives the stored program information as well as radial tracking information from the photoreceptor 22.

In FIG. 2 there is shown a preferred construction of an elasto-optic beam deflection device suitable for use as beam wobbler 17 in the system of FIG. 1. The device comprises a prism 40 of isotropic transparent material such as glass. The specific properties of the glass are not critical. Prism 40 is illustrated as a rectangular prism, but it is to be understood that other configurations such as rhomboidal may be employed. Prism 40 is of a length L and a width W in a plane perpendicular to the path of the incident light beam 16, the area of which is typically a circle several millimeters in diameter as indicated in dotted outline on the front face of prism 40.

An electromechanical transducer is coupled to glass prism 40 to establish vibration of prism 40 in response to an applied driving signal. Preferably, the electromechanical transducer comprises a thin platelet 41 of piezoelectric ceramic material glued or otherwise attached to one side of prism 40 on a face 42 parallel to beam path 16. Platelet 41 is substantially centered with respect to beam path 16 in the length direction L. In its simplest form, it may simply constitute a body of lead zirconate titanate (PZT) which is poled in the thickness direction and provided with metal electrode coatings on the inner and outer broad surfaces with associated electrical leads 43 and 44 to permit application of the electric driving signal.

The elasto-optic device of FIG. 2 with its associated electromechanical transducer 41 is constructed to vibrate in a mechanically resonant flexural mode. The resonant frequency of such vibration is substantially equal to $1.024\ V_{ext}(W/L^2)$, $V_{ext}$ is the velocity of extensional waves (propagating in a rod whose diameter is small compared to the wavelength), and is in the range of from 4,000 to 5,000 meters per second for most isotropic glass materials. Accordingly, the length L and the width W of prism 40 are proportioned to provide the device with a mechanically resonant frequency substantially equal to the desired spot wobble frequency. The attached piezoelectric platelet 41 effectuates only a very minor change in the resonant frequency of the glass bar, because of its small mass; by designing the device to operate in a mechanically resonant vibration mode, the necessity for applying balanced driving forces is obviated, and a single transducer covering only a portion of a lateral face of the prism 40 is sufficient to establish vibration in a mechanically resonant mode by the application of a very small driving power in the order of a few milliwatts.

An exaggerated view of the flexural mode vibration of prism 40 at maximum excitation in one polarity is shown in FIG. 3, with the prism being placed under compression to the right of neutral plane N and dilatation to the left of plane N, as indicated by the arrows. The mehcanical strain distribution through the prism in the width direction W at the instant illustrated in FIG. 3 is plotted as the full line characteristic of FIG. 4. The strain is zero at the center and maximum at the lateral prism surfaces, and the strain distribution is linear or presents a uniform gradient in the region of prism 40 intercepting beam path 16. One half cycle later, when the driving signal is again at a peak value but of opposite polarity, the left side of prism 40 is placed in compression and the right side in dilatation, yielding the strain distribution pattern plotted as the dashed line characteristic of FIG. 4.

Under the influence of a compressional strain, the refractive index of an isotropic transparent solid such as glass increases. If the strain within a body is not uniform but varies from point to point, the refractive index is found to vary correspondingly. In the device of FIGS. 2 and 3, the mechanical strain in the region intercepting the reading beam path varies at a uniform rate along the transverse dimension of prism 40 and this results in uniform variation or a constant gradient of the refractive index along that dimension. As a result, light entering prism 40 along path 16 is deflected toward the region of higher refractive index as though it had passed through a deflecting prism, and since the strain distribution varies with time, the deflection angle of the light varies correspondingly. At the instant that the prism is in the condition illustrated in FIG. 3, with the strain distribution indicated by the solid line characteristic of FIG. 4, the incident light beam along path 16 is deflected to the right; one-half cycle later, when the strain distribution pattern is reversed as shown by the dotted line characteristic, deflection is to the left.

In an experimental model of the device of FIG. 2, prism 40 was constructed with a length L of two centimeters, a width W of 0.5 centimeter, and a depth D in the direction of beam travel of 0.25 centimeter, yielding a flexural resonant frequency of about 60 kilohertz. The dimensions of the PZT platelet 41 were 1.34 by 0.25 by 0.26 centimeter. The platelet was thickness-polarized and was driven with a voltage of 1 volt RMS, corresponding to a power level of about 4 milliwatts. Used in a spot wobble system and an experimental video disc player of the type illustrated in FIG. 1, satisfactory operation was achieved.

In FIG. 5, there is illustrated another configuration of elasto-optic device which is useful to provide spot wobble in an optical pickup video disc player in accordance with the invention. The device of FIG. 5 is constructed to be mechanically resonant in a second harmonic extensional mode. The device comprises a prismatic transparent glass bar 50 which is of a length L equal to one whole wavelength of an extensional vibration wave in the material. Attached to one side of prism 50 on a face 51 parallel to the incident optical beam path 16 is a thin piezoelectric ceramic platelet 52 of the same type provided in the embodiment of FIG. 2, but its location is longitudinally displaced from beam path 16 rather than being substantially centered with respect to it as in the FIG. 2 embodiment. Terminals 53 and 54 are provided to permit application of an appropriate driving signal.

When a driving signal of a frequency substantially corresponding to the second harmonic extensional mode natural resonant frequency of prism 40 is applied to the piezoelectric ceramic platelet 52, a standing wave of extensional wave vibration is established within prism 50, with a sinusoidal strain distribution. The strain within the prism 50 alternates between the solid line and the dotted line characteristics illustrated in the Figure. In the central region of a size corresponding to the diameter of the incident light beam along path 16, as indicated by the dotted circle in the Figure, and extending to about ±1/12 of the full length of the bar above and below its center, the gradient of the strain is almost uniform; it varies from 100 percent at the center to 87 percent at two points which are each 1/12 of the full length displaced from the center on opposite sides thereof. A light beam penetrating this region along path 16 is deflected up and down, in the direction parallel to the length L of the prism 50. At the instant when the strain distribution is that illustrated in the full line characteristic, the direction of beam deflection is downward.

The resonant freqeuncy of this mode is $V_{ext}/L$, and accordingly this embodiment of the invention is well suited for use at relatively high resonant frequencies. For example, for a typical $V_{ext}$ of 4500 meters per second, a bar 2.25 centimeters long yields a resonant frequency of 200 kilohertz. The diameter of the central region of substantially linear strain distribution for such a device is about 0.38 centimeter.

Figure 7:
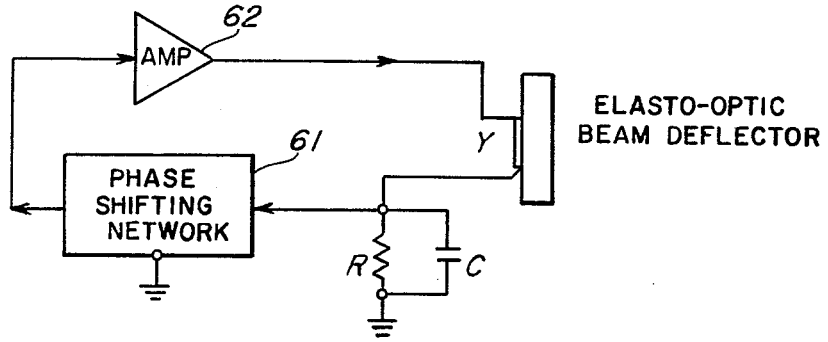
FIG. 7 is a schematic diagram of a preferred electrical driving circuit for the elasto-optic beam deflectors of FIGS. 2 and 5.

With either the flexural mode embodiment of FIG. 2 or the second harmonic extensional mode of FIG. 5, it is highly desirable to so arrange the driving circuit that the frequency of the driving current is determined by the mechanical resonance frequency of the prism. If this is accomplished, close frequency tolerances or drift compensation become unnecessary. To achieve this goal, i.e., to give the mechanical resonant frequency a controlling influence over the frequency of electrical oscillation, use is made of the strong variation of the admittance of a piezoelectric resonator in the vicinity of resonance. This effect as such is well known and has been used previously for controlling oscillators. The admittance variation is exhibited by a composite system such as those which have been described, even though most of the resonator mass is made up of a non-piezoelectric glass bar and the piezoelectric platelet has only a negligible effect upon a resonant frequency. As shown in FIG. 6, the admittance Y of the device has a pronounced peak at the frequency $f_{res}$ of mechanical resonance, followed by a dip. At the resonant frequency $f_{res}$, the admittance Y is a large conductance shunted by a capacitive susceptance which results from the passive capacitance of the platelet. In the vicinity of resonance, the phase of Y varies rapidly. In the circuit of FIG. 7, the admittance Y is made part of the feedback path of an oscillator. Resistance R is shunted by a capacitor C to insure that maximum feedback is produced at resonance. If desired, a conventional fixed phase shifting network 61 of moderate frequency selectivity may be inserted in the feedback path to produce a phase shift of either 0 or 180 degrees in the region of the mechanical resonance, the choice between the two angles depending on the number of stages included in the feedback amplifier 62. The network of FIG. 7 serves the purpose of suppressing any tendency toward oscillation at other resonant modes located at far-remote frequencies.

Figure 8:
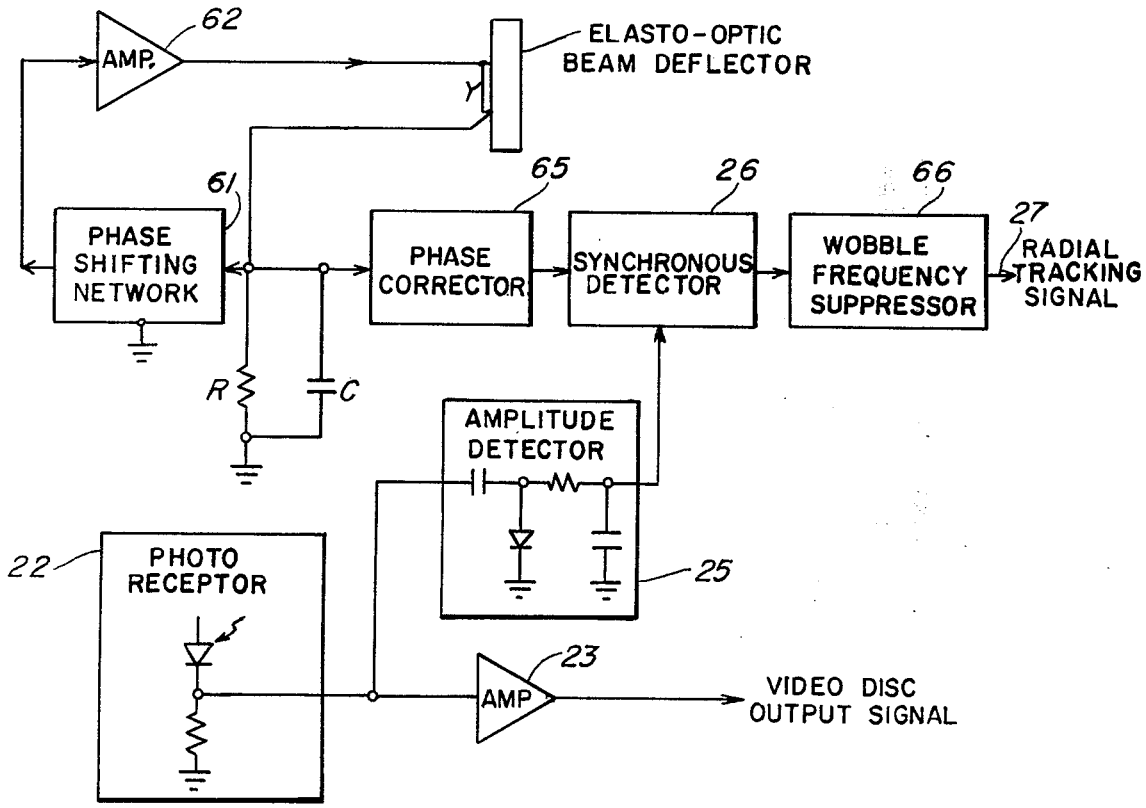
FIG. 8 is a block diagram of an optical pickup video disc player system embodying the elasto-optic beam deflector of FIG. 2 or FIG. 5 in accordance with the invention.

The entire spot wobble system is shown in FIG. 8. During oscillation at the mechanical resonant frequency, the current through resistor R is very nearly in phase with the velocity of the vibratory motion. The synchronous detector, however, requires a reference voltage which is in phase with the excursion of that motion and therefore in quadrature with the velocity. It is therefore necessary to shift the voltage taken from resistor R by about 90 degrees before applying it to the synchronous detector and this is accomplished by the provision of a quadrature phase corrector 65 between resistor R and synchronous detector 26. If desired, a wobble frequency suppressor 66 may be provided at the output of synchronous detector 26 to remove any residual wobble frequency components from the radial tracking signal to be applied to driver 20 in the system of FIG. 1.

Thus the invention provides a new and improved elasto-optic device for providing spot wobble in an optical pickup video disc player. A device constructed in accordance with the invention employs no moving parts and does not require interruption or redirection of a light beam path nor does it require critical alignment with other elements of the optical beam projecting system.

While particular embodiments of the invention have been shown and described, it will be obvious to those skilled in the art that changes and modifications may be made without departing from the invention in its broader aspects, and, therefore, the aim in the apended claims is to cover all such changes and modifications as fall within the true spirit and scope of the invention.

What is claimed is:

1. A radial tracking servo system for an optical-pickup video disc player of the type comprising means for producing a light beam and means for causing said beam to read a record track on a rotating record disc, which servo system comprises:

an elasto-optic light beam deflector including a transparent prism interposed in the path of said beam and an electromechanical transducer mechanically coupled to said prism and adapted to establish vibration therein in a mechanically resonant vibration mode;

a reference signal oscillator including said elasto-optic light beam deflector as its frequency-determining element, for causing periodic lateral deflection of said light beam relative to said record track;

means including a photoreceptor responsive to said light beam for developing an output signal including an amplitude modulation component representative of deviations of said periodically laterally deflected light beam from a centered relationship to said record track;

a quadrature phase corrector coupled to said reference signal oscillator for developing a phase-shifted reference signal;

means coupled to said photoreceptor for deriving said amplitude modulation component;

and a synchronous detector coupled to said phase corrector and to said last-mentioned means and responsive to said phase-shifted reference signal and to said amplitude modulation component for developing a radial tracking error correction signal.

2. A radial tracking servo system according to claim 1, in which said vibration mode is a flexural mode and the frequency of said vibration is substantially equal to $1.024\ V_{ext}(W/L^2)$, where $V_{ext}$ is the velocity of extensional acoustic waves in the material of said prism, and L and W are the length and width, respectively, of said prism in a plane perpendicular to said beam path.

3. An elasto-optic device according to claim 2, in which said electromechanical transducer comprises a thin platelet of piezoelectric ceramic material attached to one side of said prism on a face parallel to and in a location substantially centered with respect to said beam path.

* * * * *